(12) United States Patent
Ikeda et al.

(10) Patent No.: US 10,464,285 B2
(45) Date of Patent: Nov. 5, 2019

(54) LAMINATE AND MANUFACTURING METHOD THEREOF

(71) Applicant: PANASONIC INTELLECTUAL PROPERTY MANAGEMENT CO., LTD., Osaka (JP)

(72) Inventors: Kouji Ikeda, Hyogo (JP); Koji Motomura, Osaka (JP); Takatoshi Mitsushima, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 135 days.

(21) Appl. No.: 15/373,837

(22) Filed: Dec. 9, 2016

(65) Prior Publication Data

US 2017/0217124 A1    Aug. 3, 2017

(30) Foreign Application Priority Data

Jan. 29, 2016 (JP) .................. 2016-016311
Jan. 29, 2016 (JP) .................. 2016-016312

(51) Int. Cl.
*B32B 7/12* (2006.01)
*B32B 5/02* (2006.01)
(Continued)

(52) U.S. Cl.
CPC .............. *B32B 5/022* (2013.01); *B32B 5/024* (2013.01); *B32B 5/026* (2013.01); *B32B 5/26* (2013.01);
(Continued)

(58) Field of Classification Search
CPC . B32B 37/0046; B32B 37/0076; B32B 37/12; B32B 37/1292; B32B 38/0004;
(Continued)

(56) References Cited

U.S. PATENT DOCUMENTS 2,399,545 A * 4/1946 Davis .................. A61F 13/0226
                                                   604/389
4,690,680 A * 9/1987 Higgins .............. A61F 13/5611
                                                   604/386
(Continued)

FOREIGN PATENT DOCUMENTS

EP     983758 A1    3/2000
EP     1124521 B1   11/2003
(Continued)

OTHER PUBLICATIONS

JP-2014121699-A; machine translation (Year: 2014).*
Definition of Region (Year: 2018).*

*Primary Examiner* — Travis M Figg
(74) *Attorney, Agent, or Firm* — Pearne & Gordon LLP

(57) ABSTRACT

A laminate includes a first sheet containing first fibers, a second sheet laminated on the first sheet and containing second fibers, and an adhesive disposed between the first sheet and the second sheet. At least a part of the adhesive is disposed in an end portion along the edge side of the laminate so as to form a linear first region, and the first sheet is adhered to the second sheet via the first region. Alternatively, a mass per unit area of the adhesive present in an end portion along an edge side of the laminate is larger than a mass per unit area of the adhesive present in a portion near a central part of the laminate rather than the end portion.

13 Claims, 4 Drawing Sheets

(51) Int. Cl.
  *B32B 37/12* (2006.01)
  *B32B 38/00* (2006.01)
  *B32B 37/00* (2006.01)
  *B32B 5/26* (2006.01)
  *B32B 7/14* (2006.01)

(52) U.S. Cl.
  CPC .................. *B32B 7/12* (2013.01); *B32B 7/14* (2013.01); *B32B 37/0046* (2013.01); *B32B 37/0076* (2013.01); *B32B 37/12* (2013.01); *B32B 37/1292* (2013.01); *B32B 38/0004* (2013.01); *B32B 2250/02* (2013.01); *B32B 2250/03* (2013.01); *B32B 2250/20* (2013.01); *B32B 2262/0238* (2013.01); *B32B 2262/0246* (2013.01); *B32B 2262/0253* (2013.01); *B32B 2262/0269* (2013.01); *B32B 2262/0276* (2013.01); *B32B 2262/0284* (2013.01); *B32B 2262/0292* (2013.01); *B32B 2262/062* (2013.01); *B32B 2262/101* (2013.01); *B32B 2262/14* (2013.01); *B32B 2307/50* (2013.01); *B32B 2432/00* (2013.01); *B32B 2437/00* (2013.01); *B32B 2457/10* (2013.01); *B32B 2457/18* (2013.01); *B32B 2535/00* (2013.01)

(58) Field of Classification Search
  CPC ......... B32B 5/022; B32B 5/024; B32B 5/026; B32B 5/26; B32B 7/12; B32B 7/14; B32B 2250/02; B32B 2250/03; B32B 2250/20; B32B 2262/0238; B32B 2262/0246; B32B 2262/0253; B32B 2262/0269; B32B 2262/0276; B32B 2262/0284; B32B 2262/0292; B32B 2262/062; B32B 2262/101; B32B 2262/14; B32B 2307/50; B32B 2432/00; B32B 2437/00; B32B 2457/10; B32B 2457/18; B32B 2535/00; C09J 2201/28; C09J 2201/36; C09J 2201/40
  See application file for complete search history.

(56) References Cited

U.S. PATENT DOCUMENTS

| | | | |
|---|---|---|---|
| 4,735,837 A * | 4/1988 | Miyasaka | G09F 3/10 428/40.2 |
| 5,194,299 A * | 3/1993 | Fry | C09J 7/38 427/208.6 |
| 5,571,413 A | 11/1996 | Mogami et al. | |
| 5,714,226 A * | 2/1998 | Disselbeck | B29C 51/002 428/107 |
| 6,419,729 B1 * | 7/2002 | Duffy | B01D 39/163 55/385.6 |
| 6,495,229 B1 * | 12/2002 | Carte | A61F 13/023 428/40.1 |
| 2003/0064190 A1 * | 4/2003 | Carte | A61F 13/023 428/40.1 |
| 2004/0001930 A1 * | 1/2004 | Roth | B31D 1/021 428/40.1 |
| 2004/0053044 A1 * | 3/2004 | Moreno | C09J 7/38 428/343 |
| 2006/0269713 A1 * | 11/2006 | Zuege | B32B 7/12 428/40.1 |
| 2007/0202768 A1 * | 8/2007 | Haskett | A47L 13/16 442/327 |
| 2009/0033130 A1 * | 2/2009 | Marquette | A47C 7/74 297/180.15 |
| 2009/0162595 A1 * | 6/2009 | Ko | B05C 5/0254 428/41.9 |
| 2009/0247970 A1 * | 10/2009 | Keleny | A61F 5/441 604/333 |
| 2009/0292270 A1 * | 11/2009 | Showole | A61F 13/58 604/390 |
| 2011/0152809 A1 * | 6/2011 | Carlucci | A61F 13/1565 604/370 |
| 2013/0306679 A1 * | 11/2013 | Mercer | B05B 15/40 222/189.06 |
| 2015/0021260 A1 | 1/2015 | Iwai et al. | |

FOREIGN PATENT DOCUMENTS

| | | | | |
|---|---|---|---|---|
| JP | H06-000311 A | 1/1994 | | |
| JP | H07-031857 A | 2/1995 | | |
| JP | H10-006425 A | 1/1998 | | |
| JP | 2002-086605 A | 3/2002 | | |
| JP | 2002-524664 A | 8/2002 | | |
| JP | 2013-106939 A | 6/2013 | | |
| JP | 2014-117664 A | 6/2014 | | |
| JP | 2014-121699 A | 7/2014 | | |
| JP | 2014121699 A * | 7/2014 | | |
| WO | WO-9955790 A1 * | 11/1999 | | B05C 5/00 |
| WO | 2000/013636 A1 | 3/2000 | | |
| WO | 2013/061917 A1 | 5/2013 | | |
| WO | 2013/125506 A1 | 8/2013 | | |

* cited by examiner

LAMINATE AND MANUFACTURING METHOD THEREOF

BACKGROUND

1. Technical Field

The present disclosure relates to a laminate in which a plurality of sheets are laminated using an adhesive, and manufacturing method of the laminate.

2. Description of the Related Art

A laminate in which a plurality of sheets are laminated has high strength, and is thus used for various applications. For example, Japanese Patent Unexamined Publication No. 2014-121699 has proposed that used as a filter medium of an air purifier. This laminate includes a nonwoven fabric as a base material, another nonwoven fabric as a protection layer, and an ultrafine fiber layer interposed therebetween. The laminate is manufactured, for example, by accumulating ultrafine fibers on the nonwoven fabric (first sheet) as a base material according to electrostatic spinning method, applying an adhesive thereon, and laminating another nonwoven fabric (second sheet) as a protection layer.

SUMMARY

A first laminate according to the present disclosure includes a first sheet containing first fibers, a second sheet laminated on the first sheet and containing second fibers, and an adhesive disposed between the first sheet and the second sheet. At least a part of the adhesive is disposed in an end portion along the edge side of the laminate so as to form a linear first region, and the first sheet is adhered to the second sheet via the first region.

A second laminate according to the present disclosure includes a first sheet containing first fibers, a second sheet laminated on the first sheet and containing second fibers, and an adhesive disposed between the first sheet and the second sheet. A mass per unit area of the adhesive present in an end portion along an edge side of the laminate is larger than a mass per unit area of the adhesive present in a portion near a central part of the laminate rather than the end portion.

In a laminate manufacturing method of the present disclosure, first, a first sheet containing first fibers and a second sheet containing second fibers are prepared. Next, an adhesive is supplied to the first sheet so as to form a linear region. The second sheet is laminated on the first sheet via the adhesive so as to form a laminate. The laminate is cut so as to divide the first region.

According to the present disclosure, it is possible to suppress peeling between the sheets of the laminate.

DETAILED DESCRIPTION OF PREFERRED EMBODIMENT

Prior to description of an embodiment of the present disclosure, a problem of a laminate of the related art will be described briefly. In a case where a plurality of sheets are laminated using an adhesive, peeling occurs between the sheets if an amount of the adhesive is not sufficient. If an amount of the adhesive is increased in order to prevent peeling between the sheets, ventilation is deteriorated due to the adhesive and pressure loss is increased.

Figure 1:
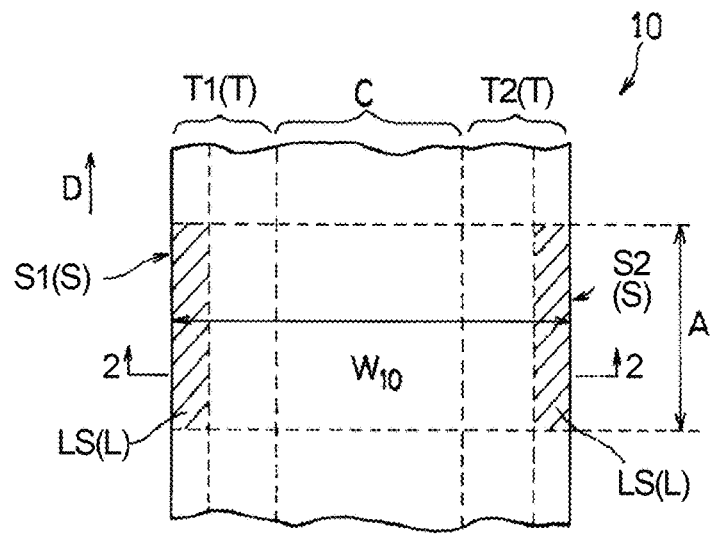
FIG. 1 is a top view schematically illustrating a laminate according to an embodiment of the present disclosure.
Figure 2:
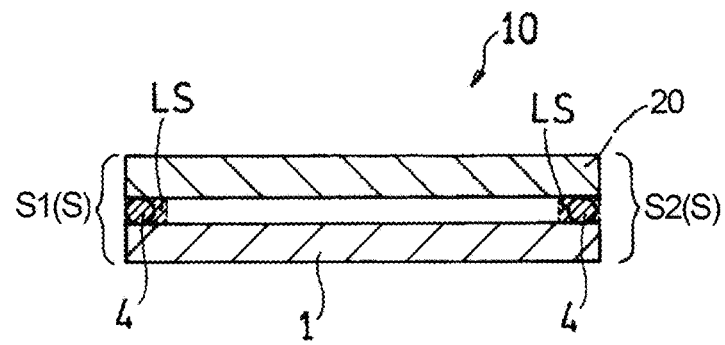
FIG. 2 is a sectional view taken along the line II-II in the laminate illustrated in FIG. 1.

Hereinafter, embodiments of the present disclosure will be described with reference to the drawings. FIG. 1 is a top view schematically illustrating laminate 10 according to the embodiment. FIG. 2 is a sectional view taken along the line II-II in laminate 10 illustrated in FIG. 1. A contour of laminate 10 is not particularly limited as long as the number of sides (edge sides) can be recognized (that is, as long as laminate 10 is not a circle an ellipse), and laminate 10 may be a long member as illustrated in FIG. 1, may have a rectangular shape, and may have other polygonal shapes.

Laminate 10 includes sheet 1, second sheet 20, and adhesive 4. First sheet 1 contains first fibers. Second sheet 20 contains second fibers, and is laminated on first sheet 1. Adhesive 4 is disposed between first sheet 1 and second sheet 20. At least a part of adhesive 4 is disposed in end portions T1 and T2 along a pair of edge sides S1 and S2 opposing each other in laminate 10 so as to form linear first regions LS which are parallel to edge sides S1 and S2. First sheet 1 is adhered to second sheet 20 via first regions LS. Note that first regions LS are substantially parallel to edge sides S1 and S2, and may be inclined in some degree with respect to edge sides S1 and S2.

The sheet containing the fibers indicates that the fibers are contained as main components. In this case, the content of the main components is 80% by weight greater. In other words, first sheet 1 contains the first fibers as main components, and second sheet 20 contains the second fibers as main components.

Figure 3:
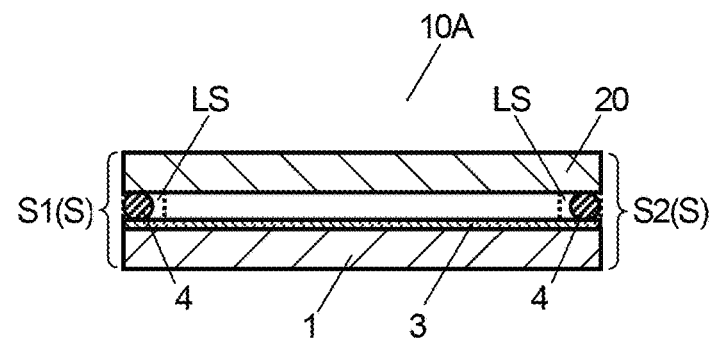
FIG. 3 is a sectional view of another laminate according to the embodiment of the present disclosure.

As in laminate 10A illustrated in FIG. 3, third sheet may be disposed between first sheet 1 and second sheet 20 and in contact with first sheet 1. FIG. 3 is a sectional view of laminate 10A according to the embodiment of the present disclosure, and FIG. 4 is a partially enlarged sectional view of laminate 10A.

Figure 4:
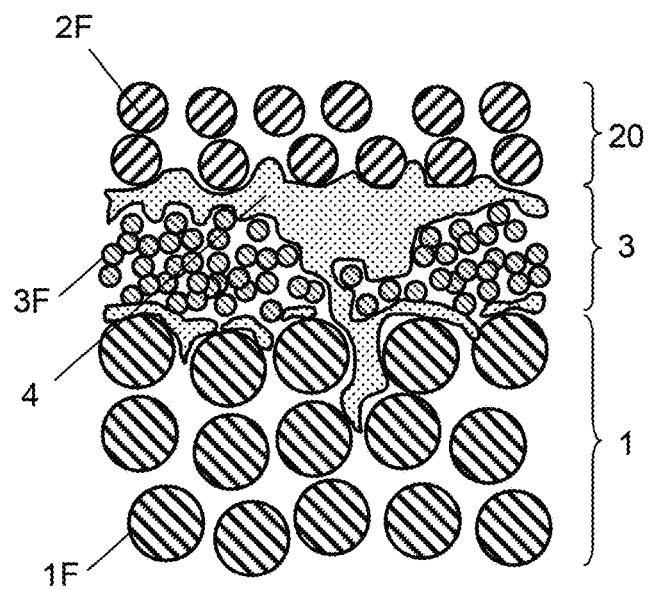
FIG. 4 is a partially enlarged sectional view of the laminate illustrated in FIG. 3.

From the viewpoint of increasing dust collection performance of laminate 10A, as illustrated in FIG. 4, third sheet 3 has third fibers 3F having average fiber diameter D3 smaller than average fiber diameter D1 of first fibers 1F and average fiber diameter D2 of second fibers 2F. A form of third sheet 3 id not particularly limited, but, as will be described later, in a case where third fibers 3F are generated according to an electrostatic spinning method, third sheet 3 is a nonwoven fabric. Also in this case, bonding strength in end portions of laminate 10A is increased, and thus peeling between third sheet 3 and first sheet 1 is prevented. In laminate 10A, adhesive 4 penetrates through third sheet 3 and attaches first sheet 1 to second sheet 20.

Third fibers 3F are accumulated on first sheet 1 according to, for example, an electrostatic spinning method. In other words, third sheet 3 containing third fibers 3F is laminated on first sheet 1 without using adhesive 4. As will be described later, in the electrostatic spinning method, third fibers 3F are generated by applying a high voltage to a raw material liquid in which a resin (raw material resin) as a raw material of third fibers 3F is dissolved into a solvent, and ejecting the raw material liquid having electric charge from a nozzle. Third fibers 3F are accumulated on first sheet 1 in a state of including the solvent, so as to be tightly adhered to first fibers 1F forming the first sheet 1, and thus both of the fibers are bonded to each other. In other words, first sheet 1 and third sheet 3 are adhered to each other through point adhesion between the fibers. Thus, third sheet 3 and first sheet 1 are easily peeled off from each other. In contrast, the bonding strength in the end portions of laminate 10A is improved, and thus peeling between third sheet 3 and first sheet 1 is also minimized.

Next, first sheet 1, second sheet 20, third sheet 3, and adhesive 4 will be described in detail as a form appropriate for a filter medium of an air purifier. Applications of laminates 10 and 10A are not limited to a filter medium.

First Sheet

First sheet 1 is, for example, a support member (base material) supporting laminate 10. A form and a material of first sheet 1 are not particularly limited, and may be selected as appropriate according to an application thereof. Specifically, first sheet 1 may have fiber structures such as a woven fabric, a knitted fabric, and a nonwoven fabric. Above all, in a case where laminate 10 is used as a filter medium, first sheet 1 is preferably a nonwoven fabric from the viewpoint of pressure loss. The nonwoven fabric is manufactured by using, for example, a spun bonding method, a dry method (for example, an air-laid method), a wet method, a melt blow method, and a needle punch method. Above all first sheet 1 is preferably a nonwoven fabric manufactured by using the wet method in that the nonwoven fabric suitable for a base material is easily formed.

In a case where first sheet 1 is a nonwoven fabric, materials of the first fibers forming first sheet 1 are not particularly limited, and may include, for example, glass fibers, cellulose, acrylic resin, polypropylene (PP), polyethylene (PE), polyester (for example, polyethylene terephthalate (PET) and polybutylene terephthalate), polyamide (PA), or mixtures thereof. Above all, as materials of the first fibers, PET or cellulose is preferably used from the viewpoint of being suitable for a filter medium. Average fiber diameter D1 of the first fibers is not particularly limited, and may be, for example, 1 μm to 40 μm, and may be 5 μm to 20 μm.

Average fiber diameter D1 is an average value of diameters of the first fibers. The diameter of the first fiber is a diameter of a section perpendicular to in a length direction of the first fiber. In a case where such a section is not circular, a maximum diameter may be considered as the diameter. A width in a direction perpendicular to the length direction of the first fiber when viewed from the normal direction of one principal surface of first sheet 1 may be regarded as the diameter of the first fiber. Average fiber diameter D1 is an average value of diameters of, for example, any ten first fibers contained in first sheet 1 at any locations. This is also the same for average fiber diameters D2 and D3 which will be described later.

A thickness of first sheet 1 is not particularly limited, and may be in a range from 50 μm to 500 μm, inclusive, and may be in a range from 150 μm to 400 μm, inclusive. The thickness of the sheet is, for example, an average value of thicknesses of any ten locations in the sheet. The thickness is a distance between two principal surfaces of the sheet. In a case where the sheet is a nonwoven fabric, a thickness of the nonwoven fabric may be obtained as follows. First, an image of a cross-section of the nonwoven fabric is taken. A line perpendicular to one principal surface is drawn from any one point on the one principal surface of the nonwoven fabric to the other principal surface. Among fibers on the line, a distance between outsides (outside dimensions) of two fibers which are most distant from each other is obtained as the thickness of the nonwoven fabric. This is similarly performed on a plurality of any other points (for example, nine points) so that thicknesses of the nonwoven fabric are calculated, and a numerical value obtained by averaging the thicknesses is used as the thickness of the nonwoven fabric. When the thickness is calculated, an image having undergone a binarization process may be used.

A mass per unit area of first sheet 1 is not particularly limited, and may be, for example, in a range from 10 $g/m^2$ to 20 $g/m^2$, inclusive, and may be in a range from 35 $g/m^2$ to 60 $g/m^2$, inclusive.

A pressure loss of first sheet 1 is also not particularly limited. Above all, in a case of performing measurement with a measuring machine in conformity with the regulations of JIS B9908, Form 1, an initial pressure loss of first sheet 1 is preferably about 1 Pa to 10 Pa. As long as the initial pressure loss of first sheet 1 falls within this range, an initial pressure loss of the whole of the laminate is also reduced.

In the test method in the above mentioned Form 1, a pressure loss is measured as follows. A filter unit having laminate 10 is held in a unit fixer without leakage of air. A static pressure measurer is attached to the filter unit. The static pressure measurer includes straight tubes sandwiching the filter unit therebetween, and the straight tubes are provided with static pressure measurement holes, respectively, perpendicular to tube walls on an upstream side and a downstream side. In this state, a blower sends wind to the filter unit in a rated air volume. The static pressure on the upstream side and that on the downstream side are measured by manometers which are connected to the static pressure measurement holes via the tubes, respectively, and thus the pressure loss is obtained.

Second Sheet

Second sheet 20 has a dust collection function, and functions as a protection layer which protects the third sheet from an external load in a case where the third sheet is laminated on first sheet 1 as will be described later.

Second sheet 20 may be, for example, a nonwoven fabric manufactured according to the above-described method. Above all, in a case where laminate 10 is used as a filter medium, second sheet 20 is preferably a nonwoven fabric manufactured by using the melt blow method from the viewpoint that it is easy to form a nonwoven fabric having a small fiber diameter. Second sheet 20 is preferably charged (permanently charged) through a charging process in that a dust collection effect can be expected. Permanent charging is a state in which electric polarization is held semi-permanently, and thus an electric field is formed on the surroundings, in a case where an external electric field is not present.

Materials of the second fibers forming second sheet 20 are not particularly limited, and may include, for example, glass fibers, cellulose, acrylic resin, PP, PE, polyester such as PET, PA, or mixtures thereof. Above all, PP is preferably used in that the material is easily charged. Average fiber diameter 132 of the second fibers is not also particularly limited. Average fiber diameter D2 may be, for example, in a range from 0.5 μm to 20 μm, inclusive, and may be in a range from 5 μm to 20 μm, inclusive.

A thickness of second sheet 20 is not particularly limited, and may be in a range from 100 µm to 500 µm, inclusive, and may be in a range from 150 µm to 400 µm, inclusive. A mass per unit area of second sheet 20 is not particularly limited, and may be in a range from 10 g/m² to 50 g/m², inclusive, and may be in a range from 10 g/m² to 30 g/m², inclusive.

A pressure loss of second sheet 20 is also not particularly limited. Above all, an initial pressure loss of second sheet 20 is preferably about 10 Pa to 50 Pa in a case where measurement is performed in the same condition as described above. As long as the initial pressure loss of second sheet 20 falls within this range, an initial pressure loss of the whole of laminate 10 is also reduced.

Adhesive

The kind of adhesive 4 is not particularly limited, and may be, for example, a hot melt adhesive having a thermosetting resin as a main component. Examples of the thermosetting resin may include polyurethane (PU), polyester such as PET, copolyester such as urethane modified copolymer polyester, PA, and polyolefin (for example, PP or PE). The hot melt adhesive is melted, for example, through heating, and is applied on first sheet 1 or second sheet 20 in a linear form. Alternatively, a granular hot melt adhesive is sprayed onto first sheet 1 or second sheet 20 in a linear form, and is melted through heating.

A mass of adhesive 4 held in laminate 10 is not particularly limited, but is preferably in a range from 0.5 g/m² to 15 g/m², inclusive, more preferably in a range from 1 g/m² to 10 g/m², inclusive, and most preferably in a range from 2 g/m² to 6 g/m², inclusive, from the viewpoint of bonding strength and pressure loss. A mass of adhesive 4 is an average mass of adhesive 4 held in end portions T1 and T2 and center portion C of laminate 10.

Third Sheet

Average fiber diameter D3 of third fibers 3F is, for example, 3 µm or less, preferably 1 µm or less, and is more preferably 300 nm or less. Average fiber diameter D3 is preferably 30 nm or more, and is more preferably 50 nm or more. As long as average fiber diameter D3 falls within this range, a pressure loss reduced, and dust collection efficiency is easily increased.

Materials of third fibers 3F are not particularly limited, and may include, for example, polymers such as PA, polyimide (PI), polyamideimide (PAI), polyetherimide (PEI), polyacetal (POM), polycarbonate (PC), polyether ether ketone (PEEK), polysulfone (PSF), polyethersulfone (PES), polyphenylene sulfide (PPS), polytetrafluoroethylene (PTFE), polyarylate (PAR), polyacrylonitrile (PAN), polyvinylidene fluoride (PVDF), polyvinyl alcohol (PVA), polyvinyl acetate (PVAc), PP, PET, and polyurethane (PU). These materials may be used alone or in combination of two or more kinds thereof. Above all, in a case where third fibers 3F are formed by using an electrostatic spinning method, PES is preferably used. PVDF is preferably used in that average fiber diameter D3 is easily reduced.

A thickness of third sheet 3 is preferably in a range from 0.5 µm to 10 µm, inclusive, and is more preferably in a range from 1 µm to 5 µm, inclusive, from the viewpoint of pressure loss. In a case where measurement is performed in the same condition as described above, an initial pressure loss of third sheet 3 is preferably about 5 Pa to 40 Pa.

A mass per unit area of third sheet 3 is preferably in a range from 0.1 g/m² to 1.5 g/m², inclusive, more preferably in a range from 0.2 g/m² to 0.5 g/m², inclusive, and most preferably in a range from 0.2 g/m² to 0.8 g/m², inclusive, from the viewpoint of balance between pressure loss and dust collection efficiency.

Hereinafter, as an example, a case where laminate 10 or 10A is long will be described. In the following description, a description will be made focusing on laminate 10, but this is also the same for laminate 10A.

Figure 6:
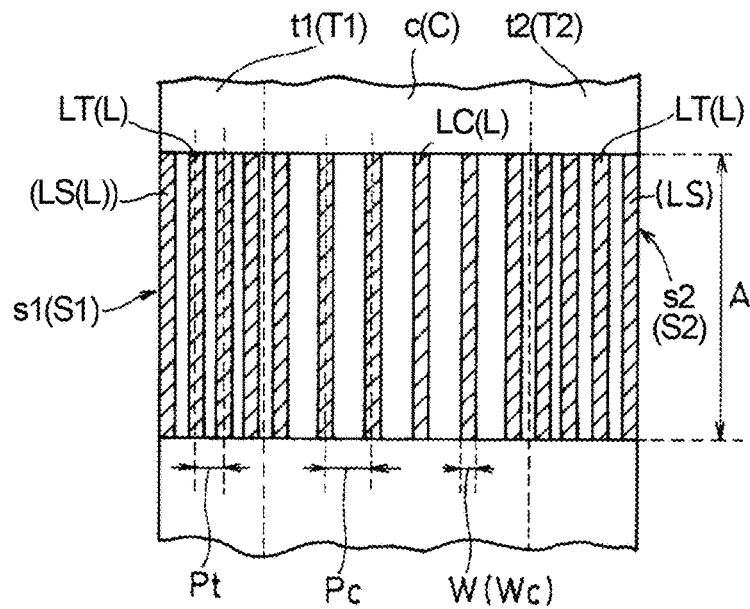
FIG. 6 is a top view for explaining arrangement of linear regions in the laminate according to the embodiment of the present disclosure.
Figure 7:
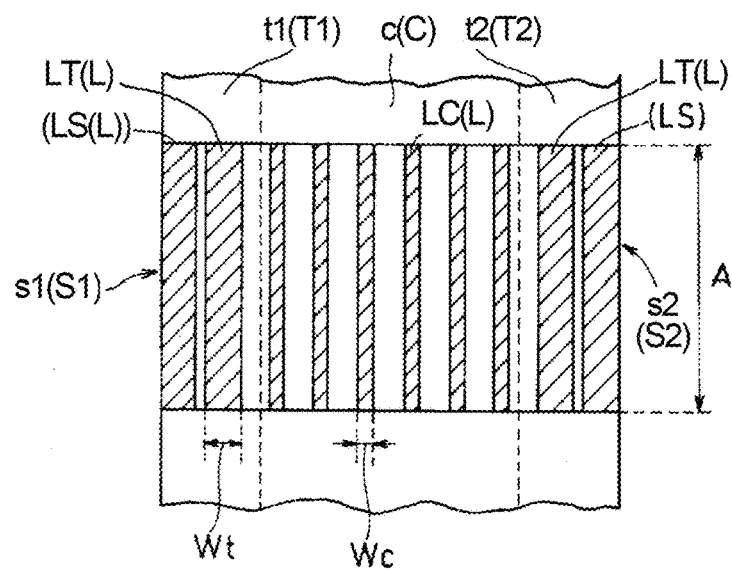
FIG. 7 is a top view for explaining arrangement of linear regions in another laminate according to the embodiment of the present disclosure.

In a case where laminate 10 is long, for convenience, among edge sides, any portion whose length in longitudinal direction D is 100 cm is set as edge side S1. A region sandwiched between edge side S1 and edge side S2 opposing edge side S1 and having a length of 100 cm is set as region A. End portions T1 and T2 and center portion C indicate end portions and the center portion other than those in region A. As illustrated in FIGS. 6 and 7 which will be described later, adhesive lines LS, LT and LC formed by adhesive 4 show linear regions formed by adhesive 4 disposed in region A.

Adhesive lines LS formed by adhesive 4 are disposed along edge sides S (S1 and S2 in the example illustrated in FIG. 1) of laminate 10 in laminate 10. In other words, first sheet 1 and second sheet 20 are adhered to each other via adhesive 4 at edge sides S as illustrated in FIG. 2. Thus, the sheets are prevented from being peeled off with edge sides S1 and S2 as starting points.

In FIGS. 1 and 2, edge side S1 and edge side S2 opposing edge side SI are exemplified as edge sides S, but edge sides S are not limited thereto. For example, only edge side S1 may be set as edge side S of laminate 10. In a case where laminate 10 has a rectangular shape or other polygonal shapes, edge sides sharing vertices with edge side S1 and edge side S2. may be set, and three or more edge sides of laminate 10 may be set. Single edge side S1 and single edge side S2 opposing edge side S1 are preferably set as edge sides of laminate 10 from the viewpoint of suppressing peeling between the sheets, and, the two edge sides are set, and thus it is possible to sufficiently achieve an effect of suppressing peeling between the sheets.

Figure 5:
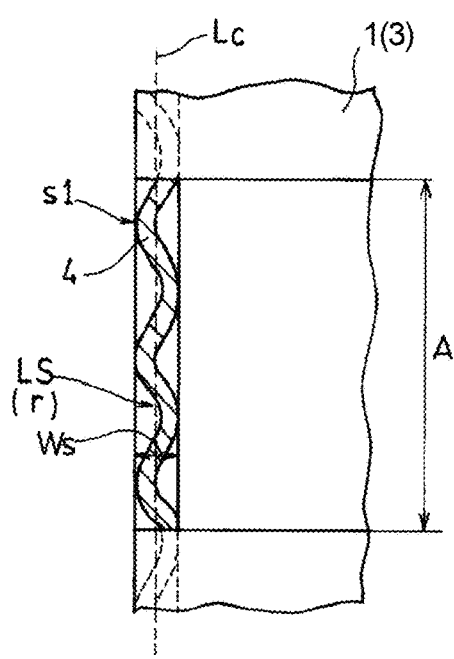
FIG. 5 is a top view for explaining a part of a linear region formed by an adhesive.

As illustrated in FIG. 5, adhesive line LS alias a length of 100 cm, and is defined as rectangle r which surrounds adhesive 4 and has the minimum width. This is also the same for adhesive lines LT and LC which will be described later. Adhesive lines LS and LT, that is, rectangles r are linear first regions in which at least a part of adhesive 4 is disposed. The first regions are formed in end portions T along edge sides S of laminate 10 so as to be parallel to edge sides S. On the other hand, adhesive lines LC are linear second regions which are provided in a portion near the center of laminate 10 rather than end portions T so as to be parallel to edge sides S.

An attachment shape of adhesive 4 is not particularly limited, and, for example, as illustrated in FIG. 5, adhesive 4 may be applied in a wavy line shape. FIG. 5 is a top view in which a part of laminate 10 is viewed from the top, and illustrates only first sheet 1 and adhesive 4 with second sheet 20 and third sheet 3 omitted. For convenience, in FIG. 5, adhesive 4 is hatched. Edge side s1 of first sheet 1 corresponds to edge side S1 of laminate 10.

Width Ws (a length in a transverse direction) of adhesive line LS disposed along edge sides S is not particularly limited. For example, width Ws of adhesive line LS is preferably 1/1000 to 1/20 of width W10 in a direction perpendicular to edge sides S of laminate 10, and is more preferably 1/500 to 1/50 thereof.

Adhesive 4 may be disposed in portions other than edge sides S1 and S2 of laminate 10. As illustrated in FIG. 1, end portions T1 and T2 including at least one edge sides S (S1 and S2 in the illustrated example), and center portion C other than those are set in laminate 10. From the viewpoint of bonding strength, adhesive 4 is also preferably disposed at center portion C of laminate 10. From the viewpoint of suppression of peeling be the sheets and pressure loss, adhesive 4 is also preferably disposed in portions other than edge sides S of end portions T1 and T2.

End portion T1 (T2) is a region ranging over a distance of 25% or less of width W10 of laminate 10 from edge side S1 (S2). In other words, end portion T1 (T2) is a strip-shaped region occupying 25% or less of an area of laminate 10 and including edge side S1 (S2) of laminate 10. FIG. 1 illustrates end portion T1 including edge side S1 and end portion T2 including edge side S2, but end portions T are not limited thereto. For example, only end portion T1 may be set as end portion T of laminate 10. In a case where laminate 10 has a rectangular shape or other polygonal shapes, edge sides sharing vertices with end portion T1 and edge side S1 may be set, and end portions including three or more edge sides of laminate 10 may be set. As end portions of laminate 10, end portion T1 including single edge side S1 and end portion T2 including edge side S2 opposing edge side S1 are preferably set from the viewpoint of suppressing peeling between the sheets.

A size of end portions T is not particularly limited as long as the size is equal to or less than 25% of the area of laminate 10, and may be set as appropriate. From the viewpoint of suppressing peeling between the sheets, a size of the single end portion T is preferably equal to or more than 5% of the area of laminate 10. In a case where end portion T1 and end portion T2 are set, a sum of areas of end portions T1 and T2 is preferably, for example, in a range from 10% to 50%, inclusive, of the area of laminate 10. In this case, the areas of end portion T1 and end portion T2 may be same as or different from each other.

In a case where adhesive 4 is disposed in end portions T and center portion C, adhesive 4 is preferably unevenly distributed to end portions T. In other words, mass Mt per unit area of adhesive 4 present in end portions T is preferably larger than mass Mc per unit area of adhesive 4 present in center portion C other than end portions T (Mt>Mc). Consequently, it is possible to suppress peeling between the sheets while reducing an amount of the adhesive to be used. A pressure loss is reduced. In FIGS. 1 to 3 and 5, adhesive 4 disposed in portions other than edge sides S1 and S2 is not illustrated. On the other hand, in FIGS. 6 and 7, adhesive 4 disposed in portions other than edge sides S1 and S2 is indicated by adhesive lines L. However, adhesive 4 may not be present between first sheet 1 and second sheet 20 at center portion C of laminate 10. In other words, Mc may be 0. However, a relationship of Mc>0 is preferably satisfied from the viewpoint of bonding strength.

In the present embodiment, adhesive 4 is disposed to form adhesive lines L which are a plurality of linear regions parallel to edge sides S of laminate 10, but the same effect can be achieved by satisfying the relationship of Mt>Mc even in a case where adhesive 4 is disposed in a manner of islands.

From the viewpoint of easily suppressing peeling between the sheets, mass Mt is preferably 1.5 or more times of mass Mc, and is more preferably three or more times thereof. From the viewpoint of cost, mass Mt is preferably less than twenty times of mass Mc, and is more preferably less than five times thereof. Specifically, mass Mt is preferably 1.5 $g/m^2$ of more, and is more preferably 3 $g/m^2$ or more. Mass Mt is preferably 20 $g/m^2$ or less, and is more preferably 15 $g/m^2$ or less. Mass Mc is preferably 0.5 $g/m^2$ or more, and is more preferably 1 $g/m^2$ or more. Mass Mc is preferably 15 $g/m^2$ or less, and is more preferably 10 $g/m^2$ or less.

Adhesive 4 may be entirely disposed in laminate 10, and may be partially disposed in laminate 10, so as to satisfy, for example, a relationship of Mt=Mc. A method of partially disposing adhesive 4 In portions other than edge sides S of laminate 10 is not particularly limited, and, for example, adhesive 4 may be disposed in a dot shape, and may be disposed in a line shape. Above all, from the viewpoint of productivity, preferably, adhesive 4 is also disposed to form adhesive lines L in directions along edge sides S in portions other than edge sides S of laminate 10.

Adhesive lines L disposed in the portions other than edge sides S of laminate 10 may be regarded as being disposed along edge sides S in a case where an angle formed between central line Lc of rectangle r in the longitudinal direction arid edge side S is 0° to 15°. Central line Lc of rectangle r (that is, the adhesive line) is a straight line which equally divides rectangle r into two portions in the transverse direction. Width W of the adhesive line is not particularly and may be the same as or different from adhesive line LS.

Hereinafter, with reference to FIGS. 6 and 7, a description will be made of a method in which adhesive 4 is also disposed to form linear regions in portions other than edge sides S laminate 10 in the direction alone edge sides S, and adhesive 4 is unevenly distributed to end portions T.

In a configuration illustrated in FIG. 6, among adhesive lines L formed by adhesive average pitch Pt between adjacent adhesive lines LT in end portions T is smaller than average pitch Pc between adjacent adhesive lines LC at center portion C. With this configuration, adhesive 4 is unevenly distributed to end portions T. FIG. 6 is a top view in which laminate 10 is viewed from the top, and illustrates only first sheet 1 and adhesive 4 with second sheet 20 and the third sheet omitted. For convenience, in FIG. 6, adhesive lines L are hatched. Edge sides s1 and s2 of first sheet 1 correspond to edge sides S1 and S2 of laminate 10, end portions t1 and t2 of first sheet 1 correspond to end portions T1 and of laminate 10, and center portion C of first sheet 1 corresponds to center portion C of laminate 10.

Pitch Pt of adhesive lines LT is an average value calculated by measuring distances between central lines Lc (refer to FIG. 5) of adjacent adhesive lines L with respect to all adhesive tines L formed in end portions T. In a case where ten or more adhesive lines LT are disposed in end portions the average value is calculated, and then an average value is calculated again after excluding data which is different from the obtained average value by 20% or more. The average value corrected in the above-described manner may be used as pitch Pt of adhesive lines LT. Pitch Pc of adhesive lines LC may also be calculated in the same manner. Adjacent adhesive lines L are adhesive lines L adjacent to each other in the same region (end portion T or center portion C), and exclude a case where the adhesive lines are present in different regions.

A ratio Pt/Pc of pitch Pt with respect to pitch Pc is preferably in a range from 0.1 to 0.5, inclusive, and is more preferably in a range from 0.2 to 0.4 inclusive. Consequently, it is possible to increase an erect of suppressing peeling between the sheets while reducing an amount of adhesive 4 disposed at center portion C. End portions may include adhesive lines LT disposed at a pitch, larger than pitch Pc, and center portion C may include adhesive lines LC disposed at a pitch smaller than Pt.

From the viewpoint of easily suppressing peeling between the sheets, adhesive lines LT disposed in end portions T preferably occupy 10% to 30% inclusive, of the area of a principal surface in the end portions T. From the viewpoint of easily suppressing an increase in the pressure loss, adhesive lines LC disposed at center portion C preferably occupy 2% to 10%, inclusive, of the area of a principal surface at center portion C. Widths W of adhesive lines L may be the same as or different from each other in end portions and at center portion C.

Width W of adhesive line L is not particularly limited. Widths Wt of a plurality of adhesive lines LT disposed in end portions may all be the same as or different from each other. Similarly, widths Wc of a plurality of adhesive lines LC disposed at center portion C may all be the same as or different from each other. Width Wt and width Wc may be the same as or different from each other. Width Wt and width Wc may be set as appropriate so that, for example, a total area of adhesive lines LT or adhesive lines LC is included in the above-described range.

In a configuration illustrated in FIG. 7, average width Wt of adhesive lines LT disposed in end portions T is larger than average width Wc of adhesive lines LC disposed at center portion C. With this configuration, adhesive 4 is unevenly distributed to end portions T. FIG. 7 is a top view in which laminate 10 is viewed from the top, and illustrates only first sheet 1 and adhesive 4 with second sheet 20 and third sheet 3 omitted. For convenience, in FIG. 7, adhesive lines L are hatched. Edge sides s1 and s2 of first sheet 1 correspond to edge sides S1 and S2 of laminate 10, end portions t1 and t2 of first sheet 1 correspond to end portions T1 and T2 of laminate 10, and center portion C of first sheet 1 corresponds to center portion C of laminate 10.

Width Wt of adhesive line LT is an average value calculated by measuring widths of all adhesive lines LT formed in end portions T. In a case where ten or more adhesive lines LT are disposed in end portions T, the average value is calculated, and then an average value is calculated again after excluding data which is different from the obtained average value by 20% or more. The average value corrected in the above-described manner may be used as width Wt. Width Wc of adhesive line LC may also be calculated in the same manner. Width W is calculated by excluding adhesive line L formed crossing the regions.

A ratio Wt/Wc of width Wt with respect to width Wc is preferably in a range from 1.5 to 20, inclusive, and is more preferably in a range from 3 to 10, inclusive. Consequently, it is possible to increase an effect of suppressing peeling between the sheets while reducing an amount of adhesive 4 disposed at center portion C. End portions may include adhesive line LT having a width smaller than width Wc, and center portion C may include adhesive line LC having a width larger than width Wt.

When laminate 10 is viewed from the normal direction of the principal surface thereof, a total area of adhesive lines LT disposed in end portions T is preferably in a range from 10% to 30%, inclusive, of the area of the principal surface in the end portions T. From the viewpoint of easily suppressing an increase in the pressure loss, a total area of adhesive lines LC disposed at center portion C is preferably in a range from 2% to 40%, inclusive, of the area of the principal surface at center portion C.

Pitch P between adhesive lines L is not particularly limited. Pitches Pt of a plurality of adhesive lines LT disposed in end portions T may all be the same as or different from each other. Similarly, pitches Pc of a plurality of adhesive lines LC disposed at center portion C may all be the same as or different from each other. Pitch Pt and pitch Pc may be the same as or different from each other. Pitch Pt and pitch Pc may be set as appropriate so that, for example, a total area of adhesive lines LT or adhesive lines LC is included in the above-described range.

Laminate 10 may be manufactured according to a method including, for example, a preparation step, an adhesive supplying step, a laminate step, and a cutting step. In other words, first, first sheet 1 containing first fibers 1F and second sheet 20 containing second fibers 2F are prepared. Next, adhesive 4 is supplied to first sheet as to form adhesive line L. Second sheet 20 is laminated on first sheet 1 using adhesive 4, and thus a laminate is formed. The laminate is then cut so as to divide adhesive line L. Before the adhesive supplying step, fibers (third fibers 3F) may be accumulated on a principal surface of first sheet 1 on which adhesive 4 is supplied, according static spinning method, so that third sheet 3 is laminated thereon.

(1) Preparation Step

In the preparation step, first sheet 1 and second sheet 20 are prepared.

(2) Third Sheet Forming Step

In a case where laminate 10A including third sheet 3 is used as a filter medium, improvement of dust collection performance cab be expected. In this step, first sheet 1 is a target of a sprayed raw material liquid, and functions as a collector collecting third fibers 3F. In this case, first sheet 1 and second sheet 20 are laminated via third sheet 3. Second sheet 20 functions as a protection member protecting third sheet 3 formed on first sheet 1.

In the elecrtrostatic spinning method, a raw material liquid is used which contains a raw material resin as a raw material of fibers and a solvent dissolving the raw material resin. The raw material liquid contains the raw material resin and the solvent. The raw material resin is a raw material of third fibers 3F, and is a polymer exemplified as a material of third fibers 3F. The solvent (hereinafter, referred to as a first solvent) dissolves the raw material resin. Fibers including the raw material resin and the first solvent are formed from the material liquid. A mixing ratio of the raw material resin and the first solvent in the raw material liquid differs depending on the kind of selected raw material resin and the kind of first solvent. A proportion of the first solvent in the raw material liquid is, for example, 60% by mass to 95% by mass, inclusive. The raw material liquid may contain not only the first solvent dissolving the raw material resin but also other solvents or various additives.

The first solvent is not particularly limited as long as the solvent can dissolve the raw material resin. Examples of the first solvent which can be used include methanol, ethanol, 1-propanol, 2-propanol, hexafluoroisopropanol, tetraethylene glycol, triethylene glycol, dibenzyl alcohol, 1,3-dioxolane, 1,4-dioxane, methyl ethyl ketone, methyl isobutyl ketone, methyl n-hexyl ketone, methyl n-propyl ketone, diisopropyl ketone, diisobutyl ketone, acetone, hexafluoroacetone, phenol, formic acid, methyl formate, ethyl formate, propyl formate, methyl benzoate, ethyl benzoate, propyl benzoate, methyl acetate, ethyl acetate, propyl acetate, dimethyl phthalate, diethyl phthalate, dipropyl phthalate, methyl chloride, ethyl chloride, methylene chloride, chloroform, o-chlorotoluene, p-chlorotoluene, carbon tetrachloride, 1,1-dichloroethane, 1,2-dichloroethane, trichloroethane, dichloropropane, dibromoethane, dibromopropane, methyl bromide, ethyl bromide, propyl bromide, acetic acid, benzene, toluene, hexane, cyclohexane, cyclohexanone, cyclopentane, o-xylene, p-xylene, m-xylene, acetonitrile, tetrahydrofuran, N,N-dimethylformamide, N,N-dimethylacetamide (DMAc), dimethyl sulfoxide pyridine, and water. These may be used alone or in combination of plural kinds thereof. Above all, DMAc is preferred in that the material is appropriate for the electrostatic spinning method, and PES is easily dissolved.

(3) Adhesive Supplying Step

Adhesive 4 is supplied onto the principal surface of first sheet 1 on which third sheet 3 is formed. Preferably, a hot melt adhesive is applied on the principal surface of first sheet 1 so that linear regions are formed, while being melted.

(4) Laminate Step

Next, the second sheet is laminated on first sheet 1 using adhesive 4 and third sheet 3.

(5) Cutting Step

Finally, first sheet 1, second sheet 20, and third sheet 3 which are laminated on each other via adhesive 4 are cut. At this time, the laminate is cut so that adhesive line formed by adhesive 4 supplied to first sheet 1 is divided. Consequently, adhesive 4 is also disposed at cut surfaces of laminate 10A, that is, edge sides other than edge sides S1 and S2 of laminate 10A.

If the third sheet forming step is omitted, laminate 10 not including third sheet 3 may be manufactured.

The above-described manufacturing method of laminate 10A may be performed by, for example, a manufacturing apparatus which conveys first sheet 1 from an upstream side to a downstream side of a manufacturing line, forms third sheet 3 on the principal surface of conveyed first sheet 1, and then laminates second sheet 20 thereon.

Figure 8:
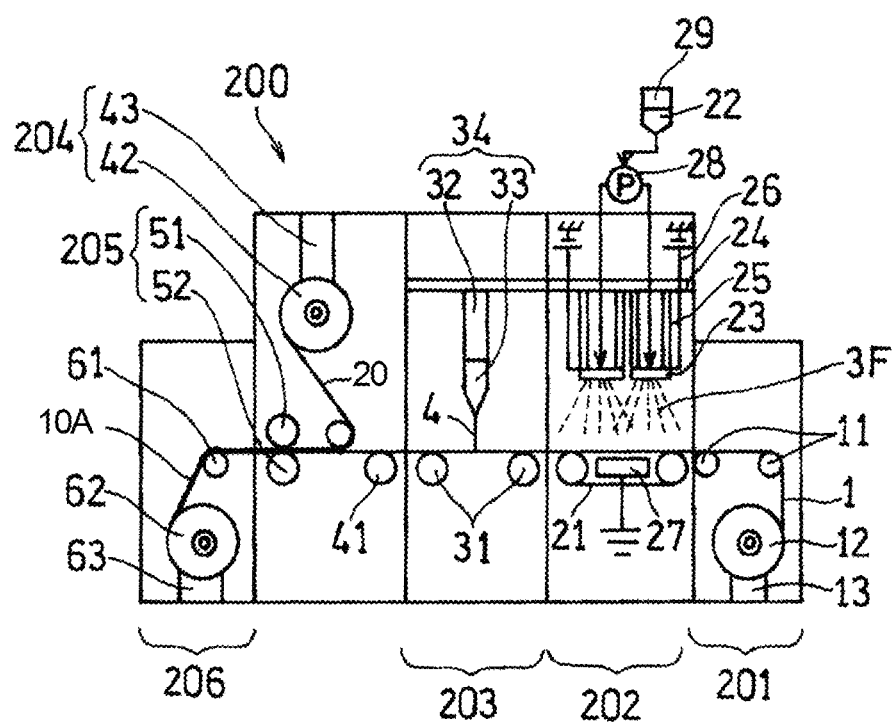
FIG. 8 is a diagram illustrating a manufacturing apparatus of the laminate according to the embodiment of the present disclosure.

Hereinafter, with reference to FIG. 8, a description will be made of manufacturing apparatus 200 of laminate 10A, but manufacturing apparatus 200 does not limit the present disclosure. FIG. 8 is a diagram schematically illustrating an example of a configuration of manufacturing apparatus 200 of laminate 10A. Manufacturing apparatus 200 includes a manufacturing line for manufacturing laminate 10A.

Manufacturing apparatus 200 includes, for example, the following configuration.

(1) First sheet feeding device 201 which feeds first sheet 1 to conveyer 21

(2) Third sheet forming device 202 which generates third fibers 3F from raw material liquid 22, and forms third sheet 3 by using electrostatic force (3) Adhesive supplying device 203 which supplies adhesive 4 in a line shape from an upper side of first sheet 1 sent from third sheet forming device 202

(4) Second sheet laminate device 204 which laminates second sheet 20 on first sheet 1 via adhesive 4 and the third sheet (5) A cutting device (not illustrated) which cuts laminated first sheet 1 and second sheet 20 so that adhesive line L formed by adhesive 4 supplied to first sheet 1 is divided The cutting device may be incorporated into the downstream side of manufacturing apparatus 200, and may be disposed separately therefrom. As the cutting device, a slitter machine provided with a rotary cutter or a straight cutter is exemplified.

First Sheet Feeding Device

First sheet feeding device 201 which accommodates therein first sheet 1 wound in a roll font is provided on the most upstream side of manufacturing apparatus 200. First sheet feeding device 201 rotates first feed reel 12 with motor 13 so as to feed first sheet 1 wound on first feed reel 12 to conveyance rollers 11.

Third Sheet Forming Device

First sheet 1 is conveyed to third sheet forming device 202 including an electrostatic spinning unit (not illustrated) by conveyance rollers 11. The electrostatic spinning mechanism provided in the electrostatic spinning unit includes discharger 23, a charger (which will be described later), and conveyer 21. Discharger 23 is provided on an upper side in the apparatus and discharges raw material liquid 22 of third fibers 3F. The charger positively charges discharged raw material liquid 22. Conveyer 21 is disposed to face discharger 23 and conveys first sheet 1 from the upstream side to the downstream side. Conveyer 21 functions as a collector which collects third fibers 3F along with first sheet 1. The number of electrostatic spinning unit is not particularly limited, and may be one, or two or more.

In a case where there are a plurality of electrostatic spinning units and/or dischargers 23, an average fiber diameter of third fibers 3F to be formed may be changed for each electrostatic spinning unit or for each discharger 23. The average fiber diameter of third fibers 3F may be changed by adjusting ejection pressure of raw material liquid 22, an applied voltage, concentration of raw material liquid 22, a distance from discharger 23 to first sheet 1, temperature, humidity, and the like. An amount of accumulated third fibers 3F is controlled by adjusting ejection pressure of raw material liquid 22, an applied voltage, concentration of raw material liquid 22, a conveyance speed of first sheet 1, and the like.

A plurality of discharge outlets (not illustrated) of raw material liquid 22 are provided on discharger 23 side facing the principal surface of first sheet 1. Although a distance between the discharge outlet of discharger 23 and first sheet 1 varies depending on a scale of a manufacturing system or a desired fiber diameter, the distance may be, for example, 100 to 600 mm. Discharger 23 is supported by second support 25 in such a manner that its own longitudinal direction is parallel to the principal surface of first sheet 1. Second support 25 is provided above the electrostatic spinning unit, and extends downwardly from first support 24 which is parallel to the conveyance direction of first sheet 1. First support 24 may be movable so that discharger 23 is swung in a direction perpendicular to the conveyance direction of first sheet 1.

The charger is formed of voltage applying device 26 applying a voltage to discharger 23, and counter electrode 27 provided to be parallel to conveyer 21. Counter electrode 27 is grounded (connected to the ground). Consequently, a potential difference (for example, 20 kV to 200 kV) corresponding to the voltage applied by voltage applying device 26 can be caused between discharger 23 and counter electrode 27. The configuration of the charger is not particularly limited. For example, counter electrode 37 may be negatively charged. The belt portion of conveyer 21 may be formed of a conductor instead of providing counter electrode 27.

Discharger 23 has a long shape and is formed of a conductor. Discharger 23 is provided with a cavity therein. The cavity functions as an accommodator accommodating raw material liquid 22 therein. Raw material liquid 22 is supplied from raw material liquid tank 29 to the cavity of discharger 23 by a pressure produced by pump 28 communicating with the cavity of discharger 23. Raw material liquid 22 is discharged from the discharge outlet toward the principal surface of first sheet 1 by the pressure produced by pump 28. Discharged raw material liquid 22 causes electrostatic explosion to generate a fibrous material (third fibers 3F) during movement in a charged state in a space (generation space) between discharger 23 and first sheet 1. Generated third fibers 3F are accumulated on first sheet 1 so as to form third sheet 3.

A configuration of the electrostatic spinning mechanism forming third fibers 3F is not limited to the above-described configuration. As long as a mechanism can generate third fibers 3F from raw material liquid 22 by an electrostatic force in a predetermined generation space of third fibers 3F, and can accumulate generated third fibers 3F on the principal surface of first sheet 1, the mechanism can be used without being particularly limited. For example, a shape of a section perpendicular to the length direction of discharger 23 may be a shape (V-shaped nozzle) which is gradually reduced from the top to the bottom.

Adhesive Supplying Device

After third sheet 3 is formed, first sheet 1 is conveyed to adhesive supplying device 203. In adhesive supplying device 203, adhesive 4 is supplied to first sheet 1 via third sheet 3 from the upper side of first sheet 1.

Adhesive supplying device 203 includes, for example, adhesive tank 32, applicator 34, and conveyance rollers 31. Adhesive tank 32 is provided on an upper side in adhesive supplying device 203 and accommodates adhesive 4. Applicator 34 has a nozzle 33 for coating adhesive 4 so that a linear region is formed on first sheet 1. Conveyance rollers 31 convey first sheet 1 to the downstream side. Adhesive tank 32 or nozzle 33 is provided with a heating device (not illustrated), and thus adhesive 4 which is a hot melt resin is discharged while being melted.

Second Sheet Laminate Device

Next, the laminate is conveyed to second sheet laminate device 204 provided with conveyance roller 41. In second sheet laminate device 204, second sheet 20 is fed from the upper side of first sheet 1, and is laminated on first sheet 1 via adhesive 4 and third sheet 3. In a case where second sheet 20 is long, second sheet 20 may be wound on second feed reel 42 in the same manner as first sheet 1. In this case, second sheet 20 is unwound from second feed reel 42 rotated by motor 43 and is laminated on first sheet 1.

Pressing Device

After second sheet 20 is laminated, laminate 10A is conveyed to pressing device 205. Pressing device 205 includes, for example, upper pressing roller 51 disposed on the upper side and lower pressing roller 52 disposed on the lower side with laminate 10A interposed therebetween. Laminate 10A is pressed with pressing rollers 51 and 52, and thus first sheet 1 and second sheet 20 are more tightly adhered to each other.

Collecting Device

Finally, laminate 10A is conveyed from pressing device 205, and is then conveyed to collecting device 206 which is disposed on the further downstream side, via roller 61. For example, collecting device 206 has therein collecting reel 62 for winding conveyed laminate 10A thereon. Collecting reel 62 is rotatably driven by motor 63.

As mentioned above, the laminate according to the present embodiment includes a first sheet containing first fibers, a second sheet laminated on the first sheet and containing second fibers, and an adhesive interposed between the first sheet and the second sheet. The adhesive is disposed to form a linear region (adhesive line LS) along edge side S at the edge side of the laminate, and thus the first sheet and the second sheet are adhered to each other via adhesive line LS. In other words, the first sheet and the second sheet are adhered to each other at least at the edge side via adhesive line LS. Consequently, peeling between the sheets is suppressed. In this case, an amount of the adhesive to be used can be reduced.

The adhesive is preferably disposed to form adhesive line LC in a direction along edge side S at center portion C other than end portion T including the edge side of the laminate. Consequently, bonding strength of the laminate is increased. From the viewpoint of suppressing peeling between the sheets, an adhesive line formed by the adhesive is also preferably disposed in portions other than edge S of end portion T. A plurality of adhesive lines LT including adhesive line LS and disposed in end portion T and a plurality of adhesive lines LC disposed at center portion C are preferably disposed.

In a case where a plurality of adhesive lines are respectively disposed in end portion T and at center portion C, average pitch Pt of adhesive LT is preferably smaller than average pitch Pc between adhesive lines LC. With this configuration, the adhesive can be unevenly distributed to end portion T, and thus it is possible to improve bonding strength in end portion T while suppressing an increase in pressure loss. In this case, a ratio Pt/Pc of pitch Pt to pitch Pc is preferably 0.1 to 0.5.

As mentioned above, in a case where a plurality of adhesive lines a respectively disposed in end portion T and at center portion C, average width Wt of adhesive lines LT is preferably larger than average width Wc of adhesive lines LC. With this configuration, the adhesive may be distributed to end portion T. In this case, a ratio Wt/Wc of width Wt to width Wc is preferably 1.5 to 20. Consequently, bonding strength in end portion T of the laminate is improved. In a case where end portion T of the laminate is cut, the laminate is easily cut on the adhesive lines, and thus the adhesive can be easily disposed on a cut surface of the laminate, that is, at the edge side of the laminate.

The laminate may include a third sheet interposed between the first sheet and the second sheet. In this case, from the viewpoint of dust collection performance when the laminate is used as a filter medium, the third sheet preferably contains third fibers having average fiber diameter D3 smaller than average fiber diameter D1 of the first fibers and average fiber diameter D2 of the second fibers.

The third fibers are accumulated on the first sheet according to, for example, an electrostatic spinning method. In other words, the third sheet containing the third fibers is laminated on the first sheet without using the adhesive. In the electrostatic spinning method, the third fibers are generated by applying a high voltage to a raw material liquid in which a resin (raw material resin) as a raw material of the third fibers is dissolved into a solvent, and ejecting the raw material liquid having electric charge from a nozzle. The third fibers are accumulated on the first sheet in a state of containing the solvent and are thus tightly adhered to the first fibers forming the first sheet, and thus both of the two fibers are bonded together. In other words, the first sheet and the third sheet are bonded to each other via point adhesion between the fibers. Thus, the third sheet and the first sheet are easily peeled off from each other. In contrast, the bonding strength in end portion T of the laminate is improved, and thus peeling between the third sheet and the first sheet is also minimized.

The laminate according to the present embodiment includes the first sheet, the second, sheet, and the adhesive, as described above. The adhesive is present between the first sheet and the second sheet in end portion T including at least one edge side of the laminate. In this case, mass Mt per unit area of the adhesive present in end portion T is larger than mass Mc per unit area of the adhesive present in center portion C other than end portion. The adhesive is unevenly distributed to end portion T of the laminate, and thus the bonding strength in end portion T is improved. Since peeling between the sheets easily occurs with end portion T of the laminate as a starting point, the bonding strength in end portion T is improved, and thus it is possible to suppress peeling between the sheets while reducing an amount of the adhesive to be used.

The adhesive is preferably disposed to form a linear first region in end portion T of the laminate in a direction along the edge side. This first region includes adhesive lines LS and LT. Consequently, it is possible to increase an effect of suppressing peeling between the sheets with a small amount of the adhesive. A pressure loss is also reduced. In this case, the adhesive is also preferably disposed to form adhesive line LC at center portion C. Particularly, the adhesive is preferably disposed to form a plurality of adhesive lines in end portion T and at center portion C, respectively.

In a case where a plurality of adhesive lines are respectively disposed in end portion T and at center portion C, average pitch Pt between adjacent adhesive lines disposed in end portions T is smaller than average pitch Pc between adjacent adhesive lines disposed at center portion C. Consequently, since the adhesive is unevenly distributed to end portion T, it is possible to easily improve the bonding strength in end portion T while suppressing an increase in the pressure loss. In this case, a ratio Pt/Pc of pitch Pt to pitch Pc is preferably 0.1 to 0.5.

As mentioned above, in a case where a plurality of adhesive lines are respectively disposed in end portion T and at center portion C, average width Wt of adhesive lines disposed in end portion T is preferably larger than average width Wc of adhesive lines disposed at center portion C. In the above-described way, the adhesive may be unevenly distributed to end portion T. Thus, when end portion T of the laminate is cut, the laminate is easily cut on the adhesive lines. Therefore, the adhesive is also easily disposed along edge sides in the laminate after being cut. As a result, peeling between the sheets is also suppressed in the laminate after being cut. In this case, a ratio Wt/Wc of width Wt to width Wc is preferably 1.5 to 20.

The laminate may include the third sheet interposed between the first sheet and the second sheet. In this case, from the viewpoint of dust collection performance when the laminate is used as a filter medium, the third sheet preferably contains the third fibers having average fiber diameter D3 smaller than average fiber diameter D1 of the first fibers and average fiber diameter D2 of the second fibers.

The above-described laminate is manufactured according to a method including a preparation step, an adhesive supplying step, a laminate step, and a cutting step. In the preparation step, the first sheet containing the first fibers and the second sheet containing the second fibers are prepared. In the adhesive supplying step, the adhesive is supplied to the first sheet so as to form an adhesive line. In the laminate step, the second sheet is laminated on the first sheet using the adhesive. In the cutting step, after the laminate step, the laminated first sheet and second sheet are cut so that the adhesive line is divided into a plurality of lines.

In the adhesive supplying step, if at least a part of the adhesive is disposed in the end portion along the edge side of the laminate so as to form the linear first region parallel to the edge side, the laminates illustrated in FIGS. 1 and 2 can be manufactured.

In the adhesive supplying step, the adhesive may be supplied to the first sheet so that mass Mt per unit area of the adhesive supplied to end portion T including at least one edge side of the first sheet is larger than mass Mc per unit area of the adhesive supplied to center portion C other than end portion T of the first sheet. According to this method, the laminate having one of the configurations illustrated in FIGS. 6 and 7 can be manufactured.

In either case, after the preparation step, and before the adhesive supplying step, the third fibers may be accumulated on the principal surface of the first sheet to which the adhesive is supplied so that the third sheet is laminated thereon according to the electrostatic spinning method. In the above-described way, for example, the laminate illustrated in FIG. 3 can be manufactured. In this laminate, the adhesive is supplied to the first sheet via the third sheet.

The laminate of the present disclosure suppresses peeling between the sheets and is thus appropriate for, for example, a filter medium of an air purifier or an air conditioner, a separation sheet for a battery, a membrane for a fuel cell, an extracorporeal inspection sheet such as a pregnancy test sheet, a medical sheet for cell culture, a dustproof cloth such as a dustproof mask or a dustproof wear, a cosmetic sheet, and a wiping sheet for wiping dust.

What claimed is:

1. A laminate comprising:
a first sheet containing first fibers;
a second sheet laminated on the first sheet and containing second fibers; and
an adhesive disposed between the first sheet and the second sheet,
wherein at least a part of the adhesive is disposed as lines of adhesive in an end portion along an edge side of the laminate so as to form a linear first region, and the first sheet is adhered to the second sheet via the first region,
wherein a part of the adhesive is disposed as lines of adhesive in a portion near a central part of the laminate so as to form a linear second region,
wherein an average pitch Pt of the lines of adhesive of the first region is smaller than an average pitch Pc of the lines of adhesive of the second region.

2. The laminate according to claim 1,
wherein the first region is one of a pair of first regions, and the other of the pair of first regions is disposed in another end portion along another edge side of the laminate, opposing the edge side.

3. The laminate according to claim 1,
wherein a ratio Pt/Pc of the average pitch Pt with respect to the average pitch Pc is in a range from 0.1 to 0.5, inclusive.

4. The laminate according to claim 1,
wherein the first region and the second region are respectively one of a plurality of first regions and one of a plurality of second regions, and the adhesive is disposed so as to form the plurality of first regions and the plurality of second regions, and
an average width Wt of the lines of of adhesive of the first region is larger than an average width Wc of the lines of adhesive of the of second region.

5. The laminate according to claim 4,
wherein a ratio Wt/Wc of the average width Wt with respect to the average width Wc is in a range from 1.5 to 20, inclusive.

6. The laminate according to claim 1, further comprising:
a third sheet disposed between the first sheet and the second sheet and in contact with the first sheet,
wherein the third sheet contains third fibers having an average fiber diameter smaller than an average fiber diameter of the first fibers and an average fiber diameter of the second fibers.

7. A laminate comprising:
a first sheet containing first fibers;
a second sheet laminated on the first sheet and containing second fibers; and
an adhesive disposed between the first sheet and the second sheet,
wherein a mass per unit area of the adhesive present in an end portion along an edge side of the laminate is larger than a mass per unit area of the adhesive present in a portion near a central part of the laminate, wherein the adhesive is disposed so as to form linear regions including lines of adhesive, wherein the linear regions include a linear first region provided in the end portion and a linear second region provided in a portion near the central part of the laminate, and wherein an average pitch Pt of the lines of adhesive of the first region is smaller than an average pitch Pc of the lines of adhesive of the second region.

8. The laminate according to claim 7, wherein a ratio Pt/Pc of the average pitch Pt with respect to the average pitch Pc is in a range from 0.1 to 0.5, inclusive.

9. The laminate according to claim 7, wherein an average width Wt of the lines of adhesive of the first region is larger than an average width Wc of the lines of adhesive of the second region.

10. The laminate according to claim 9, wherein a ratio Wt/Wc of the average width Wt with respect to the average width Wc is in a range from 1.5 to 20, inclusive.

11. The laminate according to claim 7, further comprising:

a third sheet disposed between the first sheet and the second sheet and in contact with the first sheet, wherein the third sheet contains third fibers having an average fiber diameter smaller than an average fiber diameter of the first fibers and an average fiber diameter of the second fibers.

12. A laminate comprising:

a first sheet containing first fibers;

a second sheet laminated on the first sheet and containing second fibers; and an adhesive disposed between the first sheet and the second sheet, wherein at least a part of the adhesive is disposed as lines of adhesive in an end portion along an edge side of the laminate so as to form a linear first region, and the first sheet is adhered to the second sheet via the first region, wherein a part of the adhesive is disposed as lines of adhesive in a portion near a central part of the laminate so as to form a linear second region, and wherein an average width Wt of the first region is larger than an average width Wc of the second region.

13. The laminate according to claim 12, wherein a ratio Wt/Wc of the average width Wt with respect to the average width Wc is in a range from 1.5 to 20, inclusive.

\* \* \* \* \*